(12) United States Patent
Blocksome

(10) Patent No.: US 8,694,595 B2
(45) Date of Patent: *Apr. 8, 2014

(54) LOW LATENCY, HIGH BANDWIDTH DATA COMMUNICATIONS BETWEEN COMPUTE NODES IN A PARALLEL COMPUTER

(71) Applicant: International Bussiness Machines Corporation, Armonk, NY (US)

(72) Inventor: Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,055

(22) Filed: Nov. 7, 2012

(65) Prior Publication Data

US 2013/0073752 A1    Mar. 21, 2013

Related U.S. Application Data

(63) Continuation of application No. 11/776,718, filed on Jul. 12, 2007, now Pat. No. 8,478,834.

(51) Int. Cl.
*G06F 15/167* (2006.01)
*G06F 13/28* (2006.01)

(52) U.S. Cl.
USPC ............. 709/212; 709/213; 709/216; 710/22; 710/28

(58) Field of Classification Search
USPC ................... 709/212, 213, 216; 710/22, 28
See application file for complete search history.

(56) References Cited

U.S. PATENT DOCUMENTS

| | | | |
|---|---|---|---|
| 4,933,840 A * | 6/1990 | Sera et al. | 710/57 |
| 5,050,162 A * | 9/1991 | Golestani | 370/235 |
| 5,083,265 A | 1/1992 | Valiant | |
| 5,617,537 A | 4/1997 | Yamada et al. | |
| 5,680,116 A | 10/1997 | Hashimoto et al. | |
| 5,721,921 A | 2/1998 | Kessler et al. | |
| 5,781,775 A | 7/1998 | Ueno | |

(Continued)

OTHER PUBLICATIONS

U.S. Appl. No. 11/776,707, filed Jul. 12, 2007, Blocksome.

(Continued)

*Primary Examiner* — Linglan Edwards
(74) *Attorney, Agent, or Firm* — Biggers Kennedy Lenart Spraggins, LLP

(57) ABSTRACT

Methods, systems, and products are disclosed for data transfers between nodes in a parallel computer that include: receiving, by an origin DMA on an origin node, a buffer identifier for a buffer containing data for transfer to a target node; sending, by the origin DMA to the target node, a RTS message; transferring, by the origin DMA, a data portion to the target node using a memory FIFO operation that specifies one end of the buffer from which to begin transferring the data; receiving, by the origin DMA, an acknowledgement of the RTS message from the target node; and transferring, by the origin DMA in response to receiving the acknowledgement, any remaining data portion to the target node using a direct put operation that specifies the other end of the buffer from which to begin transferring the data, including initiating the direct put operation without invoking an origin processing core.

8 Claims, 9 Drawing Sheets

(56) References Cited

U.S. PATENT DOCUMENTS

| | | | |
|---|---|---|---|
| 5,790,530 | A | 8/1998 | Moh et al. |
| 5,928,351 | A | 7/1999 | Horie et al. |
| 6,072,781 | A | 6/2000 | Feeney et al. |
| 6,085,303 | A | 7/2000 | Thorson et al. |
| 6,105,122 | A * | 8/2000 | Muller et al. .................... 712/1 |
| 7,054,958 | B2 * | 5/2006 | Iyer et al. ...................... 710/22 |
| 7,155,541 | B2 | 12/2006 | Ganapathy et al. |
| 7,805,546 | B2 | 9/2010 | Archer et al. |
| 7,827,024 | B2 | 11/2010 | Archer et al. |
| 7,836,143 | B2 | 11/2010 | Blocksome et al. |
| 2003/0233497 | A1 | 12/2003 | Shih |
| 2005/0114561 | A1 | 5/2005 | Lu et al. |
| 2005/0198113 | A1 | 9/2005 | Mohamed et al. |
| 2006/0045005 | A1 | 3/2006 | Blackmore et al. |
| 2006/0045109 | A1 | 3/2006 | Blackmore et al. |
| 2006/0047771 | A1 | 3/2006 | Blackmore et al. |
| 2006/0056405 | A1 | 3/2006 | Chang et al. |
| 2006/0075057 | A1 | 4/2006 | Gildea et al. |
| 2006/0150010 | A1 * | 7/2006 | Stiffler et al. .................. 714/13 |
| 2006/0161733 | A1 | 7/2006 | Beckett et al. |
| 2006/0161737 | A1 * | 7/2006 | Martin et al. ................ 711/147 |
| 2006/0206635 | A1 | 9/2006 | Alexander et al. |
| 2006/0253619 | A1 | 11/2006 | Torudbakken et al. |
| 2008/0101295 | A1 | 5/2008 | Tomita et al. |
| 2008/0109573 | A1 | 5/2008 | Leonard et al. |
| 2008/0222317 | A1 | 9/2008 | Go et al. |
| 2008/0267066 | A1 | 10/2008 | Archer et al. |
| 2008/0270563 | A1 | 10/2008 | Blocksome et al. |
| 2008/0281997 | A1 | 11/2008 | Archer et al. |
| 2008/0301704 | A1 | 12/2008 | Archer et al. |
| 2008/0313341 | A1 | 12/2008 | Archer et al. |
| 2009/0006808 | A1 | 1/2009 | Blumrich et al. |
| 2009/0019190 | A1 | 1/2009 | Blocksome |
| 2009/0022156 | A1 | 1/2009 | Blocksome |
| 2009/0031001 | A1 | 1/2009 | Archer et al. |
| 2009/0031002 | A1 | 1/2009 | Blocksome |
| 2009/0031055 | A1 | 1/2009 | Archer et al. |
| 2009/0154486 | A1 | 6/2009 | Archer et al. |
| 2009/0248894 | A1 | 10/2009 | Archer et al. |
| 2009/0248895 | A1 | 10/2009 | Archer et al. |
| 2010/0268852 | A1 | 10/2010 | Archer et al. |
| 2011/0197204 | A1 | 8/2011 | Archer et al. |
| 2012/0137294 | A1 | 5/2012 | Archer et al. |
| 2013/0018947 | A1 | 1/2013 | Archer et al. |

OTHER PUBLICATIONS

U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action, U.S. Appl. No. 12/702,661, Dec. 14, 2012.
Office Action, U.S. Appl. No. 12/956,903, Mar. 19, 2013.
Watson, R., "DMA controller programming in C," C Users Journal, Nov. 1993, pp. 35-50 (10 Total Pages), v11 n11, R & D Publications, Inc., Lawrence, KS, USA. ISSN: 0898-9788.
Notice of Allowance, U.S. Appl. No. 12/702,661, May 15, 2013, pp. 1-9.
Notice of Allowance, U.S. Appl. No. 13/666,604, Sep. 25, 2013, pp. 1-10.
Office Action, U.S. Appl. No. 13/666,604, May 30, 2013, pp. 1-16.
Office Action, U.S. Appl. No. 13/676,700, Jun. 5, 2013, pp. 1-31.
Office Action, U.S. Appl. No. 13/671,055, Jul. 31, 2013, pp. 1-18.
Office Action, U.S. Appl. No. 13/769,715, Jul. 31, 2013, pp. 1-28.
Office Action, U.S. Appl. No. 11/829,334, Sep. 18, 2009, pp. 1-14.
Office Action, U.S. Appl. No. 11/829,339, Sep. 15, 2009, pp. 1-15.
Office Action, U.S. Appl. No. 11/746,333, Feb. 5, 2010, pp. 1-11.
Office Action, U.S. Appl. No. 11/829,325, Nov. 27, 2009, pp. 1-15.
Office Action, U.S. Appl. No. 11/739,948, Apr. 1, 2010, pp. 1-6.
Final Office Action, U.S. Appl. No. 11/829,339, Apr. 1, 2010, pp. 1-16.
Final Office Action, U.S. Appl. No. 11/829,334, Mar. 8, 2010, pp. 1-15.
Final Office Action, U.S. Appl. No. 11/776,718, Feb. 23, 2010, pp. 1-20.
Notice of Allowance, U.S. Appl. No. 11/746,333, Jun. 23, 2010, pp. 1-5.

* cited by examiner

LOW LATENCY, HIGH BANDWIDTH DATA COMMUNICATIONS BETWEEN COMPUTE NODES IN A PARALLEL COMPUTER

CROSS-REFERENCE TO RELATED APPLICATION

This application is a continuation application of and claims priority from U.S. patent application Ser. No. 11/776,718, filed on Jul. 12, 2007.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for low latency, high bandwidth data transfers between compute nodes in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather operation.

When a parallel application running on a particular compute node transmits a message to another compute node connected to the particular compute node through a data communications network, the application typically provides messaging software with a pointer to an application buffer storing the message. The messaging software describes the message in the application buffer to a direct memory access ('DMA') engine, which in turn, sends the message through the network using a DMA transfer operation such as, for example, a memory FIFO transfer operation or a direct put transfer operation. In the current art, a data transfer between compute nodes in a parallel computer is implemented using one of these DMA transfer operations. Though each of these DMA transfer operations has certain advantages, performing a data transfer between compute nodes using either a memory FIFO transfer operation or a direct put transfer operation also has certain drawbacks. As such, readers will appreciate that room for improvement exists in low latency, high bandwidth data transfers between compute nodes in a parallel computer.

SUMMARY OF THE INVENTION

Methods, systems, and products are disclosed for low latency, high bandwidth data transfers between compute nodes in a parallel computer that include: receiving, by an origin direct memory access ('DMA') engine on an origin compute node, a buffer identifier for a buffer containing data for transfer to a target compute node; sending, by the origin DMA engine to a target DMA engine on the target compute node, a request to send ('RTS') message; transferring, by the origin DMA engine, a portion of the data to the target compute node using a memory FIFO operation, the memory FIFO operation specifying one end of the buffer from which to begin transferring the portion of the data; receiving, by the origin DMA engine, an acknowledgement of the RTS message from the target compute node; and transferring, by the origin DMA engine in response to receiving the acknowledgement of the RTS message, any remaining portion of the data to the target compute node using a direct put operation, including initiating the direct put operation without invoking an origin processing core on the origin compute node, the direct put operation specifying the other end of the buffer from which to begin transferring the remaining portion of the data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
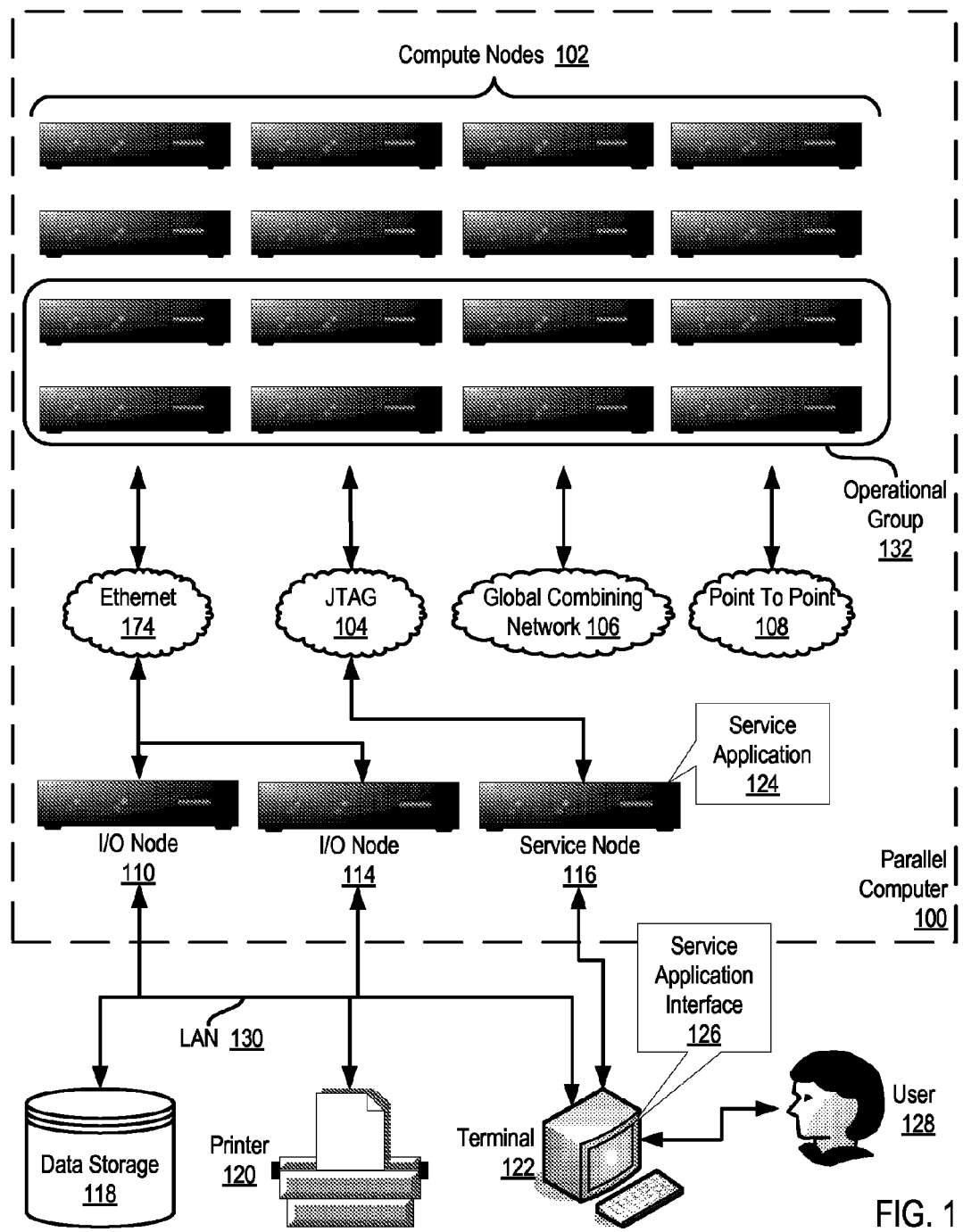
FIG. 1 illustrates an exemplary system for low latency, high bandwidth data transfers between compute nodes in a parallel computer according to embodiments of the present invention.

Exemplary methods, systems, and computer program products for low latency, high bandwidth data transfers between compute nodes in a parallel computer according to embodiments of the present invention are described with reference to the accompanying drawings, beginning with FIG. 1. FIG. 1 illustrates an exemplary system for low latency, high bandwidth data transfers between compute nodes in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for low latency, high bandwidth data transfers between compute nodes in a parallel computer according to embodiments of the present invention. The system of FIG. 1 operates generally for low latency, high bandwidth data transfers between compute nodes in a parallel computer according to embodiments of the present invention as follows: An origin direct memory access ('DMA') engine on an origin compute node receives a buffer identifier for a buffer containing data for transfer to a target compute node. The origin DMA engine sends a request to send ('RTS') message to a target DMA engine on the target compute node. The origin DMA engine transfers a portion of the data to the target compute node using a memory FIFO operation. The memory FIFO operation specifies one end of the buffer from which to begin transferring the portion of the data. The origin DMA engine receives an acknowledgement of the RTS message from the target compute node. The origin DMA engine transfers, in response to receiving the acknowledgement of the RTS message, any remaining portion of the data to the target compute node using a direct put operation, including initiating the direct put operation without invoking an origin processing core on the origin compute node. The direct put operation specifies the other end of the buffer from which to begin transferring the remaining portion of the data. Readers will note that the origin compute node is a compute node attempting to transmit data, while the target compute node is a compute node intended as the recipient of the data.

A memory FIFO data transfer operation is a mode of transferring data using DMA engines, typically a DMA engine on an origin node and a DMA engine on a target node. In a memory FIFO data transfer operation, data is transferred along with a data descriptor describing the data from one DMA engine to another DMA engine. The DMA engine receiving the data and its descriptor in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put data transfer operation is a mode of transferring data using DMA engines, typically a DMA engine on an origin node and a DMA engine on a target node. A direct put operation allows data to be transferred and stored to a particular compute node with little or no involvement from the compute node's processor. To effect minimal involvement from the compute node's processor in the direct put operation, the DMA engine of the sending compute node transfers the data to the DMA engine on the receiving compute node along with a specific identification of a storage location on the receiving compute node. The DMA engine on the receiving compute node then stores the data in the storage location specified by the sending compute node's DMA engine. The sending compute node's DMA engine is aware of the specific storage location on the receiving compute node because the specific storage location for storing the data on the receiving compute node has been previously provided to the DMA engine of the sending compute node.

The arrangement of nodes, networks, and I/O devices making up the exemplary system illustrated in FIG. 1 are for explanation only, not for limitation of the present invention. Data processing systems capable of low latency, high bandwidth data transfers between compute nodes in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of low latency, high bandwidth data transfers between compute nodes in a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Low latency, high bandwidth data transfers between compute nodes in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of low latency, high bandwidth data transfers between compute nodes in a parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
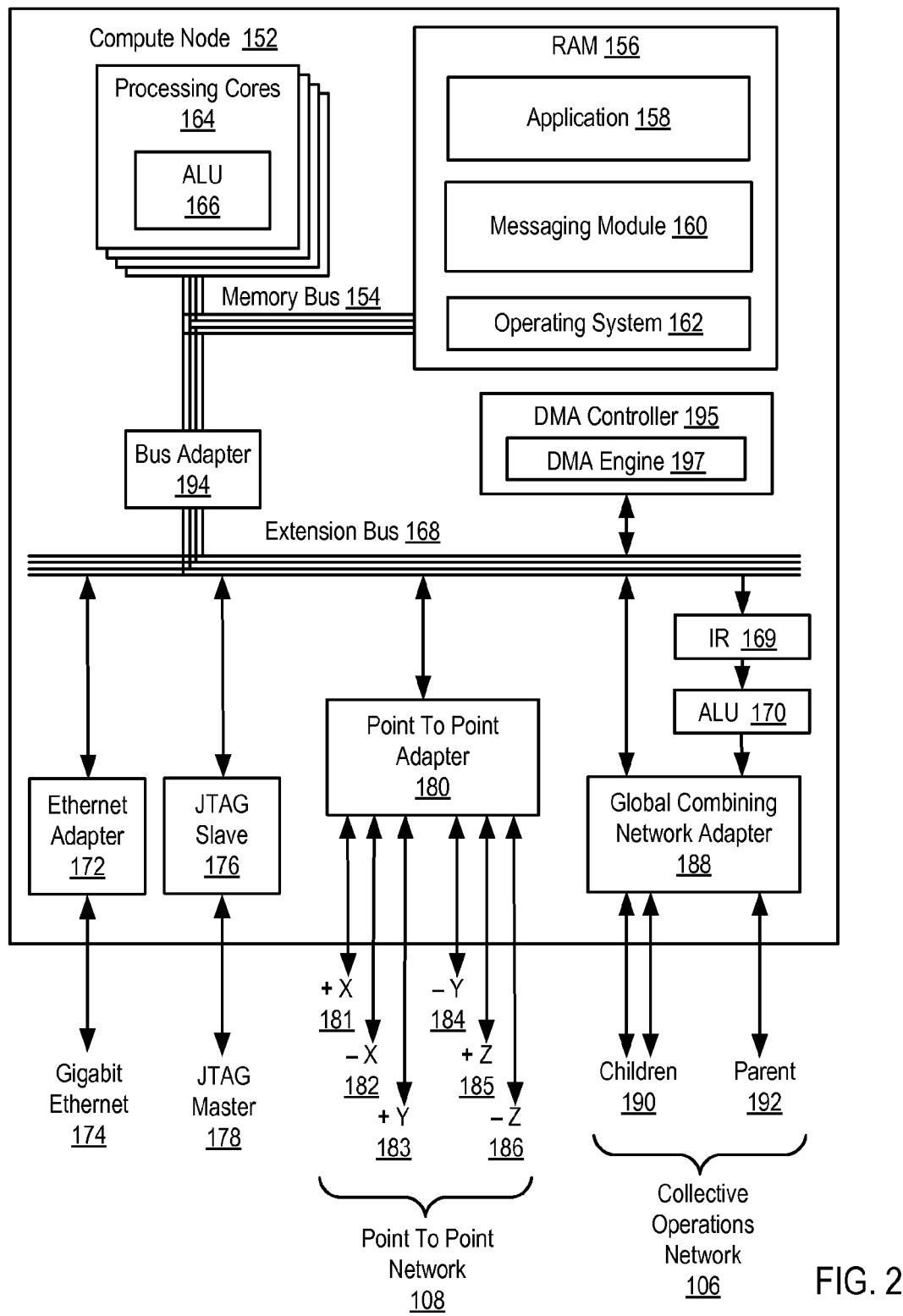
FIG. 2 sets forth a block diagram of an exemplary compute node useful in a parallel computer capable of low latency, high bandwidth data transfers between compute nodes in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for low latency, high bandwidth data transfers between compute nodes in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in low latency, high bandwidth data transfers between compute nodes in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) is typically stored in computer memory included in the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

The DMA engine (197) of FIG. 2 is improved for low latency, high bandwidth data transfers between compute nodes in a parallel computer according to embodiments of the present invention. The DMA engine (197) of FIG. 2 operates generally for low latency, high bandwidth data transfers between compute nodes in a parallel computer according to embodiments of the present invention by: receiving a buffer identifier for a buffer containing data for transfer to a target compute node; sending a request to send ('RTS') message to a target DMA engine on the target compute node; transferring a portion of the data to the target compute node using a memory FIFO operation, the memory FIFO operation specifying one end of the buffer from which to begin transferring the portion of the data; receiving an acknowledgement of the RTS message from the target compute node; and transferring, in response to receiving the acknowledgement of the RTS message, any remaining portion of the data to the target compute node using a direct put operation, including initiating the direct put operation without invoking an origin processing core on the origin compute node, the direct put operation specifying the other end of the buffer from which to begin transferring the remaining portion of the data.

Figure 3A:
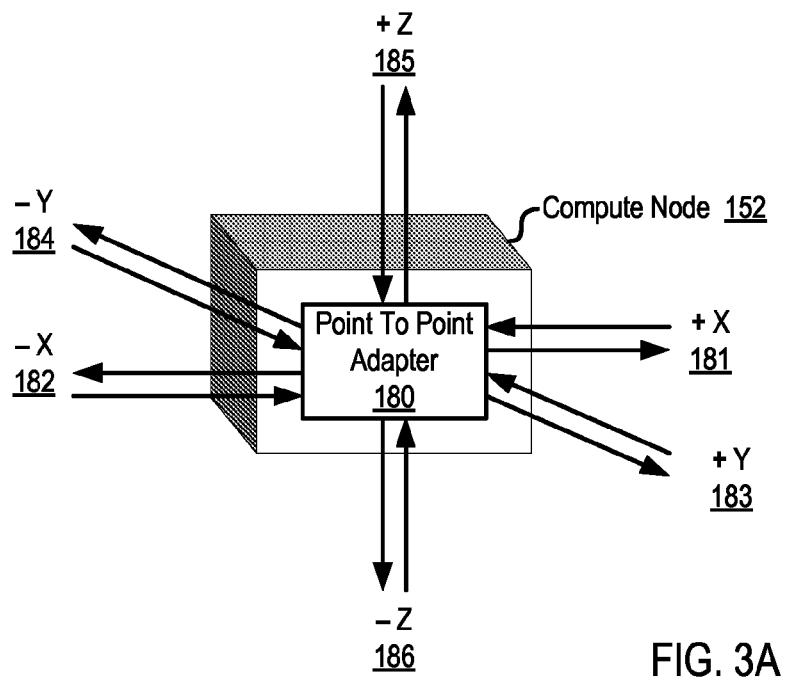
FIG. 3A illustrates an exemplary Point To Point Adapter useful in systems capable of low latency, high bandwidth data transfers between compute nodes in a parallel computer according to embodiments of the present invention.

For further explanation, FIG. 3A illustrates an exemplary Point To Point Adapter (180) useful in systems capable of low latency, high bandwidth data transfers between compute nodes in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
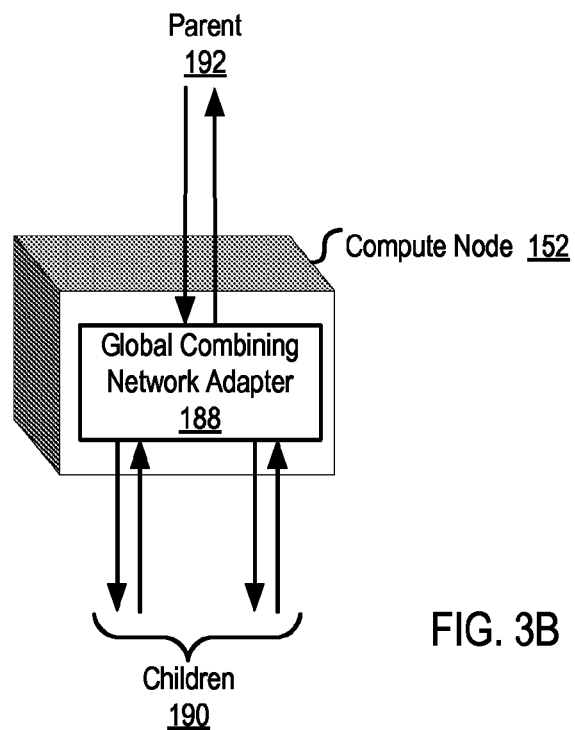
FIG. 3B illustrates an exemplary Global Combining Network Adapter useful in systems capable of low latency, high bandwidth data transfers between compute nodes in a parallel computer according to embodiments of the present invention.

For further explanation, FIG. 3B illustrates an exemplary Global Combining Network Adapter (188) useful in systems capable of low latency, high bandwidth data transfers between compute nodes in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
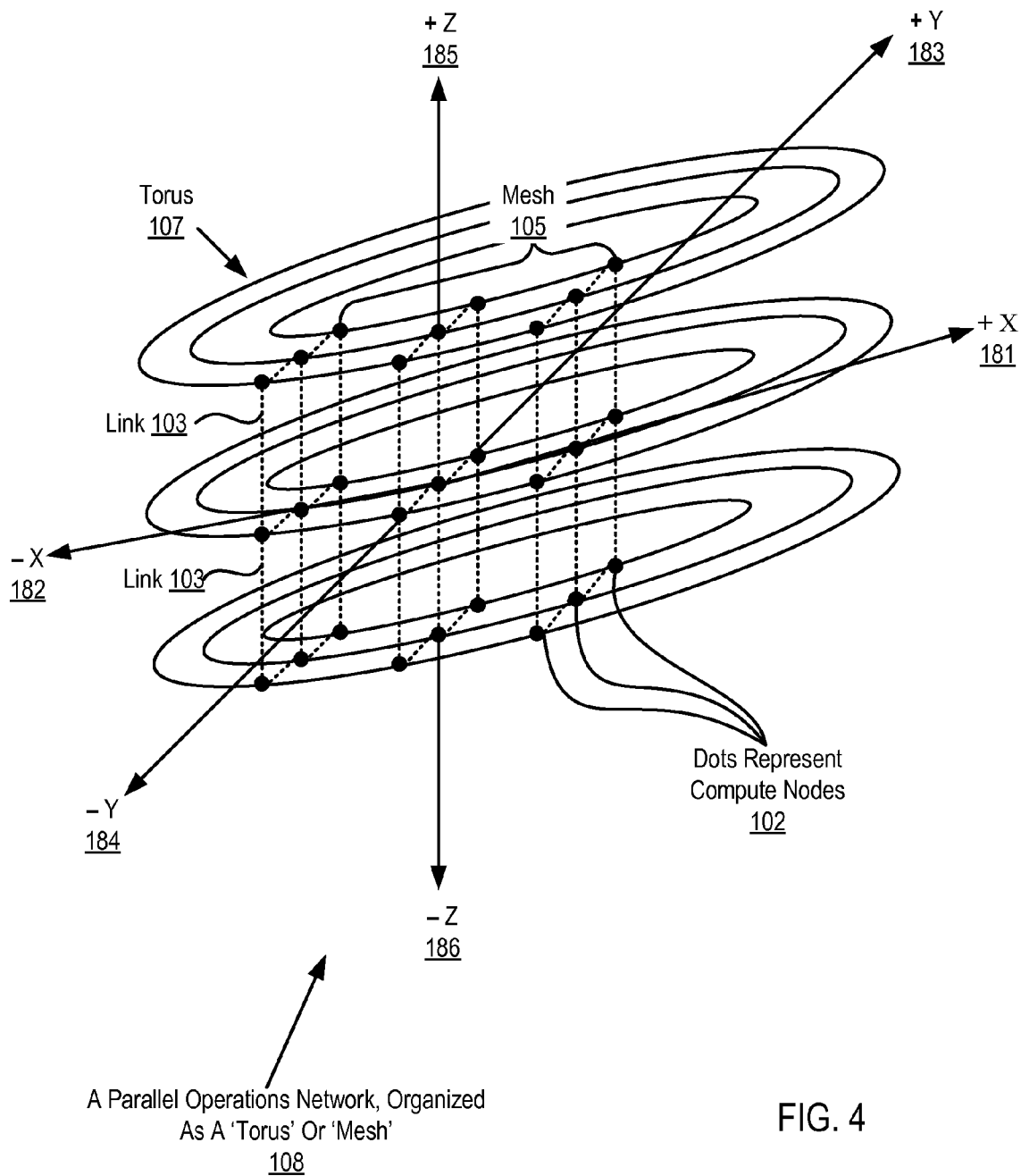
FIG. 4 sets forth a line drawing illustrating an exemplary data communications network optimized for point to point operations useful in systems capable of low latency, high bandwidth data transfers between compute nodes in a parallel computer in accordance with embodiments of the present invention.

For further explanation, FIG. 4 sets forth a line drawing illustrating an exemplary data communications network (108) optimized for point to point operations useful in systems capable of low latency, high bandwidth data transfers between compute nodes in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in low latency, high bandwidth data transfers between compute nodes in a parallel computer in accordance with embodiments of the present invention may contain only a few compute nodes or may contain thousands of compute nodes.

Figure 5:
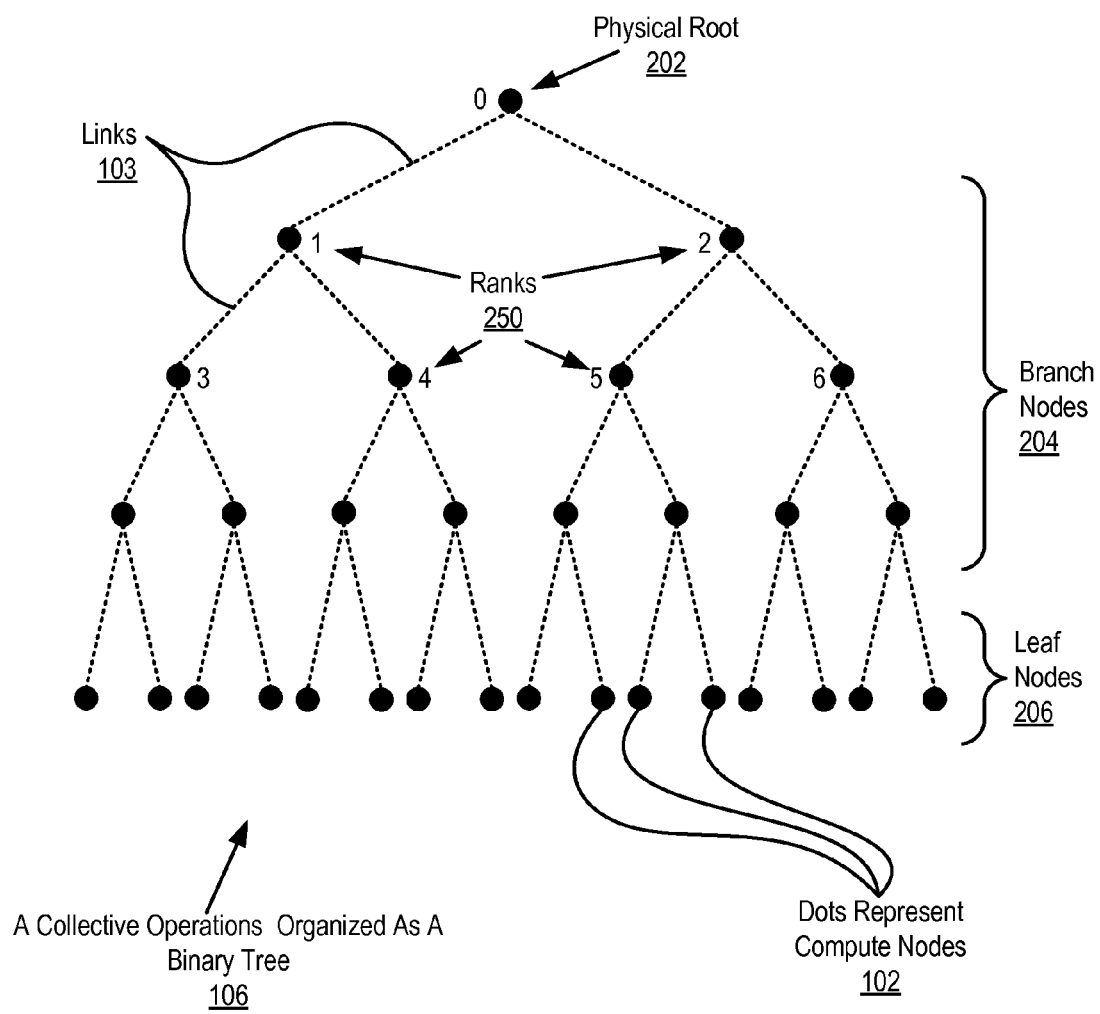
FIG. 5 sets forth a line drawing illustrating an exemplary data communications network optimized for collective operations useful in systems capable of low latency, high bandwidth data transfers between compute nodes in a parallel computer in accordance with embodiments of the present invention.

For further explanation, FIG. 5 sets forth a line drawing illustrating an exemplary data communications network (106) optimized for collective operations useful in systems capable of low latency, high bandwidth data transfers between compute nodes in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for low latency, high bandwidth data transfers between compute nodes in a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
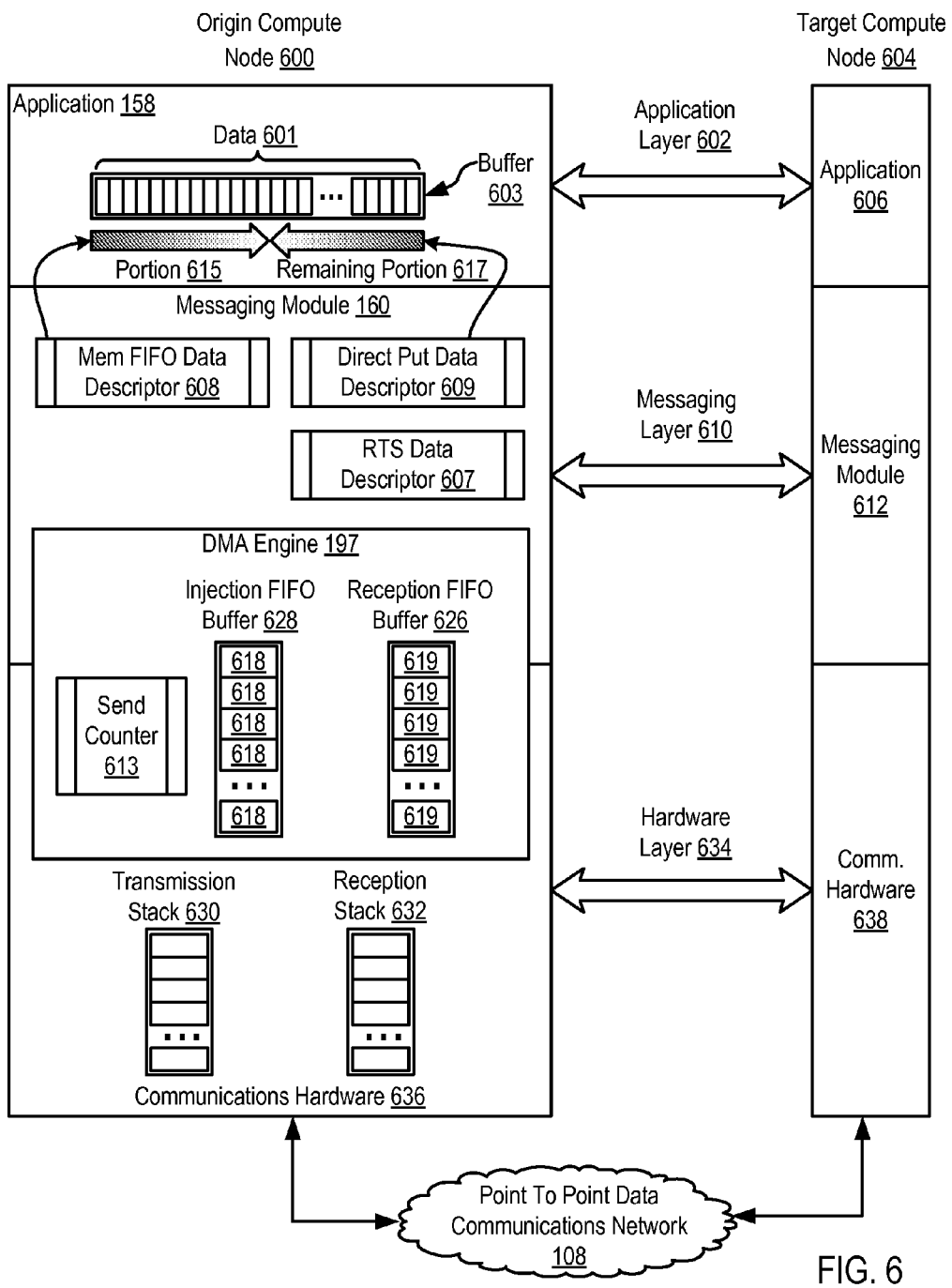
FIG. 6 sets forth a block diagram illustrating an exemplary communications architecture illustrated as a protocol stack useful in low latency, high bandwidth data transfers between compute nodes in a parallel computer according to embodiments of the present invention.

For further explanation, FIG. 6 sets forth a block diagram illustrating an exemplary communications architecture illustrated as a protocol stack useful in low latency, high bandwidth data transfers between compute nodes in a parallel computer according to embodiments of the present invention. The exemplary communications architecture of FIG. 6 sets forth two compute nodes, an origin compute node (600) and a target compute node (604). Only two compute nodes are illustrated in the example of FIG. 6 for ease of explanation and not for limitation. In fact, low latency, high bandwidth data transfers between compute nodes in a parallel computer according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600) and an application (606) installed on the target compute node (604). In the example of FIG. 6, the application (158) on the origin compute node (600) has data (601) for transmission to the application (606) on the target compute node (604). Data communications between applications (158, 606) are effected using messaging modules (160, 612) installed on each of the compute nodes (600, 604). Applications (158, 606) may communicate by invoking function of an application programming interfaces ('API') exposed by the application messaging modules (606, 612). To transmit the data (601) to the application (606), the application (158) of FIG. 6 may invoke a function of an API for messaging module (160) that passes a buffer identifier of a buffer (603) containing the application message (601) to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158, 606) in the application layer (602). In the example of FIG. 6, the messaging layer (610) is composed of messaging module (160) installed on the origin compute node (600) and messaging module (612) installed on the target compute node (604).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600, 604) on the physical network medium. The hardware layer (634) of FIG. 6 is composed of communications hardware (636) of the origin compute node (600), communications hardware (638) of the target compute node (636), and the data communications network (108) connecting the origin compute node (600) and the target compute node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging layer (610) and the hardware layer (634). The DMA engine (197) is shown in both the messaging layer (610) and the hardware layer (634) because a DMA engine useful in low latency, high bandwidth data transfers between compute nodes in a parallel computer according to embodiments of the present invention may often provide messaging layer interfaces and also implement communications according to some aspects of the communication hardware layer (634). The exemplary DMA engine (197) of FIG. 6 includes an injection first-in-first-out ('FIFO') buffer (628) for storing data descriptors (618) that specify DMA transfer operations for transferring data. The exemplary DMA engine (197) of FIG. 6 also includes a reception FIFO buffer (626) used to receive network packets (619) from other DMA engines on other compute nodes. The DMA engine (197) of FIG. 6 also includes a send counter (613) that is a DMA counter used to track when data transfers are complete. Although FIG. 6 only illustrates a single injection FIFO buffer (628) and a single reception FIFO buffer (626), readers will note that a DMA engine may have access to any number of injection FIFO buffers and reception FIFO buffers. Readers will also note that in a system having multiple injection FIFO buffers or multiple reception FIFO buffers, the buffers may not all have the same processing priority. For example, some of the buffers may be designated 'high priority,' while other buffers may be designated as 'normal priority' or 'low priority.' Similarly, a DMA engine typically includes multiple DMA counters, although FIG. 6 merely illustrates a single DMA counter.

In the example of FIG. 6, the DMA engine (197) is improved for low latency, high bandwidth data transfers between compute nodes in a parallel computer according to embodiments of the present invention. The DMA engine (197) of FIG. 6 operates generally for low latency, high bandwidth data transfers between compute nodes in a parallel computer according to embodiments of the present invention by: receiving a buffer identifier for a buffer (603) containing data (601) for transfer to a target compute node (604); sending a request to send ('RTS') message to a target DMA engine on the target compute node (604); transferring a portion (615) of the data (601) to the target compute node using a memory FIFO operation, the memory FIFO operation specifying one end of the buffer (603) from which to begin transferring the portion (615) of the data (601); receiving an acknowledgement of the RTS message from the target compute node (640); and transferring, in response to receiving the acknowledgement of the RTS message, any remaining portion (617) of the data (601) to the target compute node using a direct put operation, including initiating the direct put operation without invoking an origin processing core on the origin compute node (600), the direct put operation specifying the other end of the buffer (603) from which to begin transferring the remaining portion (617) of the data (601).

An RTS message is a message that indicates that the origin compute node has data to transfer to the target compute node. Typically, the RTS message also describes the data on the origin compute node to the target compute node in sufficient detail for the target compute node to issue a remote get operation for transferring the data using only DMA operations that do no invoke the processing core on the origin compute node. In such a manner, the processing core on the origin compute node initially constructs the RTS message describing the data for transfer, and then the actual data transfer is coordinated and carried out by the DMA engines on the origin compute node and the target compute node.

A direct put operation is a mode of transferring data using DMA engines, typically a DMA engine on an origin node and a DMA engine on a target node. A direct put operation allows data to be transferred and stored to a particular compute node with little or no involvement from the compute node's processor. To effect minimal involvement from the compute node's processor in the direct put operation, the DMA engine of the sending compute node transfers the data to the DMA engine on the receiving compute node along with a specific identification of a storage location on the receiving compute node. The DMA engine on the receiving compute node then stores the data in the storage location specified by the sending compute node's DMA engine. The sending compute node's DMA engine is aware of the specific storage location on the receiving compute node because the specific storage location for storing the data on the receiving compute node has been previously provided to the DMA engine of the sending compute node.

A memory FIFO data transfer operation is a mode of transferring data using DMA engines, typically a DMA engine on an origin node and a DMA engine on a target node. In a memory FIFO data transfer operation, data is transferred along with a data descriptor describing the data from one DMA engine to another DMA engine. The DMA engine receiving the data and its descriptor in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

The messaging module (160) of FIG. 6 supports low latency, high bandwidth data transfers between compute nodes in a parallel computer according to embodiments of the present invention. To support low latency, high bandwidth data transfers between compute nodes in a parallel computer according to embodiments of the present invention, the messaging module (160) receives a buffer identifier of an application buffer containing the application message (601) and creates a memory FIFO data descriptor (608), a direct put data descriptor (609), and an RTS data descriptor (607) for the application message (601). The memory FIFO data descriptor (608) and the direct put data descriptor (609) are both used to transfer portions of the data (601) contained in the buffer (603) to the target compute node (604). The memory FIFO data descriptor (608) is used to transfer portion (615) of the data (601) using a memory FIFO data transfer operation and specifies one end of the buffer (603) from which to begin transferring the portion (615) of the data (601). The direct put data descriptor (609) is used to transfer any remaining portion (617) of the data (601) not transferred by the memory FIFO operation using a direct put data transfer operation and specifies the other end of the buffer (603) from which to begin transferring the remaining portion (617) of the data (601).

As mentioned above, transferring data using a direct put operation requires that the origin compute node (600) be aware of the storage location on the target compute node (604) where the data is to be stored. After creating the direct put data descriptor (609), therefore, the origin compute node (600) sends the direct put data descriptor (609) to the target compute node (604) for inscribing target node-specific information into the direct put data descriptor (609) such as, for example, the storage location on the target compute node (604) where the data is to be stored. The origin compute node (600) sends the direct put data descriptor (609) to the target compute node (604) as part of a RTS message that is created based on the RTS data descriptor (607), which specifies the direct put data descriptor (609) as the payload for the RTS message. Upon receiving the direct put data descriptor (609) and inscribing target node-specific information, the target compute node (604) then sends the direct put data descriptor (609) back to the origin compute node for injection into the origin node's injection FIFO buffer (628) using a remote get operation. A remote get operation is a DMA operation that allows a compute node to retrieve data from another compute node without involving the processor on the compute node providing the data by injecting a descriptor into the other computer node's DMA FIFO buffers.

Figure 7:
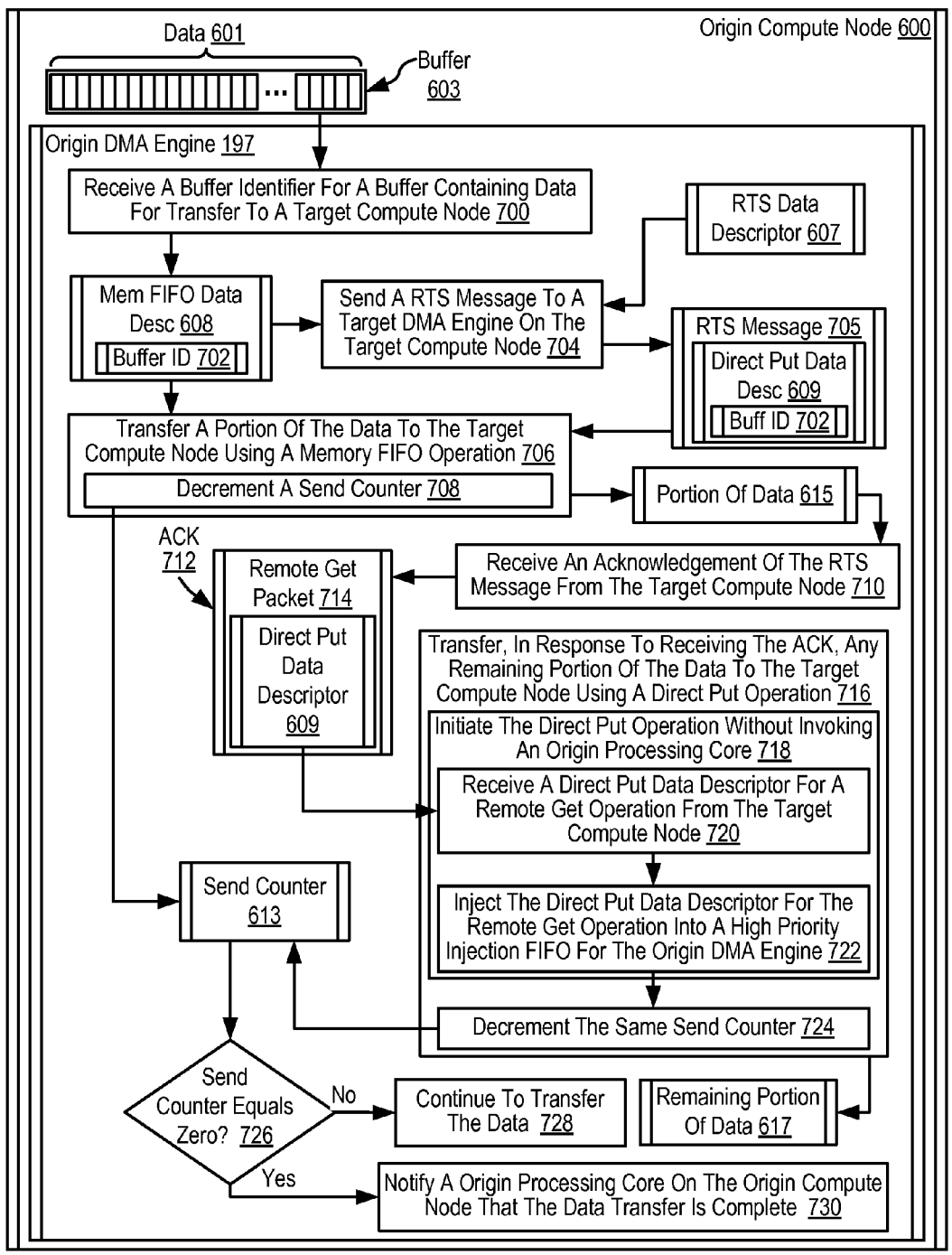
FIG. 7 sets forth a flow chart illustrating an exemplary method for low latency, high bandwidth data transfers between compute nodes in a parallel computer according to the present invention.

For further explanation, FIG. 7 sets forth a flow chart illustrating an exemplary method for low latency, high bandwidth data transfers between compute nodes in a parallel computer according to the present invention. The method of FIG. 7 includes receiving (700), by an origin direct memory access ('DMA') engine (197) on an origin compute node (600), a buffer identifier (702) for a buffer (603) containing data (601) for transfer to a target compute node. The buffer identifier (702) of FIG. 7 specifies the specific location in computer memory on the origin compute node (600) that contains the data (601) for transfer to the target compute node. The origin DMA engine (197) may receive (700) the buffer identifier (702) according to the method of FIG. 7 as part of receiving a memory FIFO data descriptor (608) for injection into an injection FIFO buffer of the origin DMA engine (197) from messaging software running on the origin compute node (600). The messaging software may create the memory FIFO data descriptor (608) in response to a request by an application on the origin compute node (600) to transfer the data (601) to the target compute node on behalf of the application. As mentioned above, the memory FIFO data descriptor (608) is used to transfer portion (615) of the data (601) using a memory FIFO data transfer operation and specifies one end of the buffer (603) from which to begin transferring a portion (615) of the data (601).

The method of FIG. 7 also includes sending (704), by the origin DMA engine (197) to a target DMA engine on the target compute node, a request to send ('RTS') message (705). The RTS message (705) is used by the origin DMA engine (197) to provide the target compute node with a direct put data descriptor (609) used to transfer any remaining portion (617) of the data (601) to the target compute node. The target compute node inscribes target node-specific information in the direct put data descriptor (609) such as, for example, the storage location for the data (601) on the target compute node, and injects the direct put data descriptor (609) into an injection FIFO buffer for the origin DMA engine (197) using a remote get operation. The origin DMA engine (197) may send (704) the RTS message (705) to the target DMA engine on the target compute node according to the method of FIG. 7 by injecting a RTS data descriptor (607) in an injection FIFO buffer of the origin DMA engine (197) and processing the RTS data descriptor (607). The RTS data descriptor (607) of FIG. 7 specifies the direct put data descriptor (609) as the payload for the RTS message (705). As mentioned above, the direct put data descriptor (609) is used to transfer any remaining portion (617) of the data (601) not transferred by the memory FIFO operation using a direct put data transfer operation and specifies the other end of the buffer (603) from which to begin transferring the remaining portion (617) of the data (601).

The method of FIG. 7 also includes transferring (706), by the origin DMA engine (197), a portion (615) of the data (601) to the target compute node using a memory FIFO operation. The origin DMA engine (197) may transfer (706) a portion (615) of the data (601) to the target compute node using a memory FIFO operation according to the method of FIG. 7 by injecting the memory FIFO data descriptor (608) into the injection FIFO buffer for the origin DMA engine (197) and processing chunks of the data (601) according to the memory FIFO data descriptor (608). The origin DMA engine (197) may process chunks of the data (601) by starting with the chunks at one end of the buffer (603) and processing through the chunks of data (601) toward the opposite end of the buffer (603). For example, the origin DMA engine (197) may process chunks of the data (601) by starting at the lowest memory address in the buffer (603) and working toward the highest memory address in the buffer (603). The origin DMA engine (197) may process each chunk of data (601) by retrieving the chunk of the data (601) from the buffer (603), packetizing the chunk of data (601) into a network packet having a header specified by the memory FIFO data descriptor (608), and transmitting the packet through a data communications network to the target compute node. The end of the buffer (603) from which the origin DMA engine (197) begins to transfer the portion (615) of the data (601) using the memory FIFO operation may be specified by in the memory FIFO data descriptor (608).

Transferring (706), by the origin DMA engine (197), a portion (615) of the data (601) to the target compute node using a memory FIFO operation according to the method of FIG. 7 includes decrementing (708) a send counter (613). The send counter (613) of FIG. 7 is a DMA counter used to track when the transfer of the data (601) is complete. In the example of FIG. 7, the origin DMA engine (197) typically initializes the send counter (613) by storing the size of the data (601) as the value for the send counter (613). The origin DMA engine (197) may decrement (708) the send counter (613) according to the method of FIG. 7 by reducing the value of the send counter (613) after transmitting each network packet that contains a chunk of the portion (615) of the data (601). The origin DMA engine (197) may reduce the value of the send counter (806) by the size of the chunk contained in each network packet.

The method of FIG. 7 includes receiving (710), by the origin DMA engine (197), an acknowledgement (712) of the RTS message (705) from the target compute node. The acknowledgement (712) of FIG. 7 is implemented as a remote get packet (714) that includes the direct put data descriptor (609) sent to the target compute node as part of the RTS message (705). The remote get packet (714) of FIG. 7 is a network packet that instructs the origin DMA engine (197) to inject the direct put data descriptor (609) into an injection FIFO buffer for the origin DMA engine (197). Often, such a remote get packet (714) may specify injecting the direct put data descriptor (609) into a high priority injection FIFO buffer.

Readers will note that while the origin DMA engine (197) waits to receive the acknowledgement (712) to the RTS message (705) from the target compute node, the origin DMA engine (197) continues to transfer a portion (615) of the data (601) to the target compute node using a memory FIFO operation. Transferring a portion (615) of the data (601) to the target compute node using a memory FIFO operation while waiting to receive the acknowledgement (712) to the RTS message (705) advantageously allows the origin DMA engine (197) to reduce overall latency of the entire data transfer.

The method of FIG. 7 also includes transferring (716), by the origin DMA engine (197) in response to receiving the acknowledgement (712) of the RTS message (705), any remaining portion (617) of the data (601) to the target compute node using a direct put operation, including initiating (718) the direct put operation without invoking an origin processing core on the origin compute node. The origin DMA engine (197) initiates (718) the direct put operation without invoking an origin processing core on the origin compute node (600) according to the method of FIG. 7 by receiving (720) a direct put data descriptor (609) for a remote get operation from the target compute node and injecting (722) the direct put data descriptor (609) for the remote get operation into a high priority injection FIFO buffer for the origin DMA engine (197).

The origin DMA engine (197) may transfer (716) any remaining portion (617) of the data (601) to the target compute node using a direct put operation according to the method of FIG. 7 by processing chunks of the data (601) according to the direct put data descriptor (609) injected into the high priority injection FIFO buffer. The origin DMA engine (197) may process chunks of the data (601) by starting with the chunks at the opposite end of the buffer (603) than the end from which the memory FIFO operation began. For example, if the origin DMA engine (197) started transferring the data (601) using a memory FIFO operation from the end of the buffer (603) having the lowest memory address, then the origin DMA engine (197) may start transferring the data (601) using a direct put operation from the end of the buffer (603) having the highest memory address. The origin DMA engine (197) may process each chunk of data (601) by retrieving the chunk of the data (601) from the buffer (603), packetizing the chunk of data (601) into a network packet having a header specified by the direct put data descriptor (609), and transmitting the packet through a data communications network to the target compute node. The end of the buffer (603) from which the origin DMA engine (197) begins to transfer the portion (615) of the data (601) using a direct put operation may be specified by in the direct put data descriptor (609).

Transferring (716), by the origin DMA engine (197) in response to receiving the acknowledgement (712) of the RTS message (705), any remaining portion (617) of the data (601) to the target compute node using a direct put operation according to the method of FIG. 7 also includes decrementing (724) the same send counter (613) decremented as the data (601) is transferred using a memory FIFO operation. Because both the memory FIFO operation and the direct put operation result in the origin DMA engine (197) decrementing the same send counter (613), when the send counter (613) reaches zero, the origin DMA engine (197) will have transferred all the data (601) to the target compute node—a portion (615) of the data (601) transferred using the memory FIFO operation and any remaining portion (617) transferred using the direct put operation.

The method of FIG. 7 includes determining (726), by the origin DMA engine (197), whether the send counter (613) is decremented to zero. The origin DMA engine (197) may determine (726) whether the send counter (613) is decremented to zero according to the method of FIG. 7 by identifying the value of the send counter (613) each time the send counter (613) is decremented. If the value of the send counter (613) is zero, then the send counter (613) is decremented to zero. If the value of the send counter (613) is not zero, then the send counter (613) is not decremented to zero.

The method of FIG. 7 includes continuing (728) to transfer the data (601) if the send counter (613) is not decremented to zero. The origin DMA engine (197) may continue to transfer the data (601) according to the method of FIG. 7 by continuing to transfer the portion (615) of the data (601) to the target compute node using a memory FIFO operation and continuing to transfer any remaining portion (617) of the data (601) to the target compute node using a direct put operation as discussed above.

The method of FIG. 7 also includes notifying (730), by the origin DMA engine (197), an origin processing core on the origin compute node (600) that the data transfer is complete if the send counter (613) is decremented to zero. The origin DMA engine (197) may notify (730) an origin processing core on the origin compute node (600) that the transfer is complete according to the method of FIG. 7 by triggering an interrupt. Triggering an interrupt serves to notify the processing core on the origin compute node (600) that the transfer of the data (601) is complete. The origin DMA engine (197) may also notify (730) an origin processing core on the origin compute node (600) that the transfer is complete according to the method of FIG. 7 by setting the status bit corresponding to the send counter (613) in a DMA counter status register. Setting the status bit corresponding to the send counter (613) in a DMA counter status register serves to notify the processing core on the origin compute node (600) that the transfer of the data (601) is complete because the processing core may periodically poll the DMA counter status register.

The description of FIG. 7 explains low latency, high bandwidth data transfers between compute nodes in a parallel computer according to embodiments of the present invention from the perspective of an origin compute node. For further explanation of low latency, high bandwidth data transfers between compute nodes in a parallel computer according to embodiments of the present invention from the perspective of a target compute node, consider FIG. 8 that sets forth a flow chart illustrating a further exemplary method for low latency, high bandwidth data transfers between compute nodes in a parallel computer according to the present invention.

Figure 8:
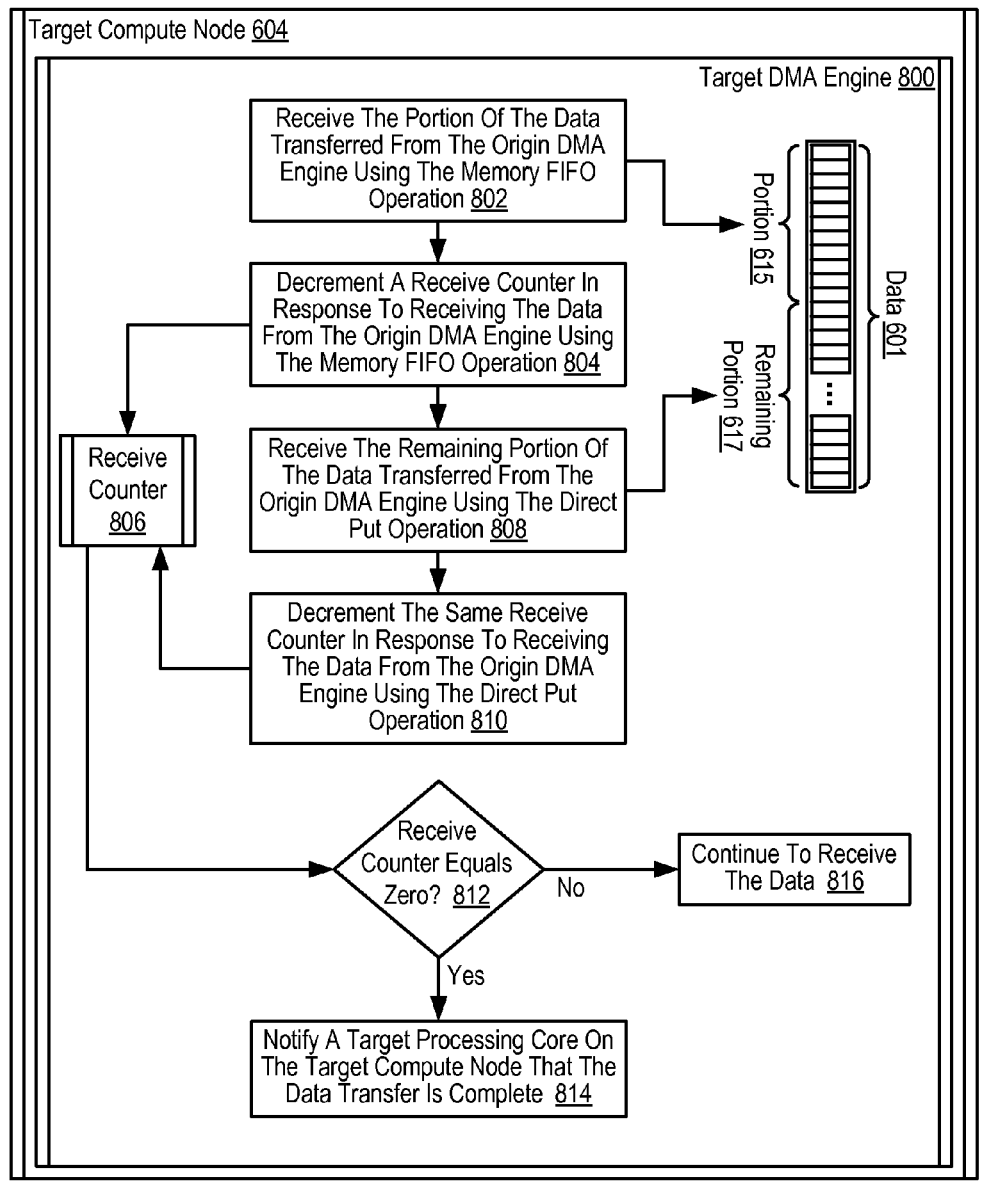
FIG. 8 sets forth a flow chart illustrating a further exemplary method for low latency, high bandwidth data transfers between compute nodes in a parallel computer according to the present invention.

The method of FIG. 8 includes receiving (802), by a target DMA engine (800) on the target compute node (604), the portion (615) of the data (601) transferred from the origin DMA engine using the memory FIFO operation. The target DMA engine (800) may receive (802) the portion (615) of the data (601) transferred from the origin DMA engine using the memory FIFO operation according to the method of FIG. 8 by receiving network packets from the origin DMA engine that contain chunks of the portion (615) of the data (601) transferred using a memory FIFO transfer, storing the network packets in temporary storage for further processing by a processing core on the target compute node (604) when the transfer of data (601) is complete.

The method of FIG. 8 includes decrementing (804), by the target DMA engine (800), a receive counter (806) in response to receiving the data (601) from the origin DMA engine using the memory FIFO operation. The receive counter (806) is a DMA counter used to track when the transfer of the data (601) is complete. In the example of FIG. 8, the target DMA engine (800) typically initializes the receive counter (806) by storing the size of the data (601) as the value for the receive counter (806). The target DMA engine (800) may initially obtain the size of the data (601) to be transferred from a Request To Send ('RTS') message sent by the origin compute node to the target compute node (604). The target DMA engine (800) may decrement (804) a receive counter (806) according to the method of FIG. 8 by reducing the value of the receive counter (806) after receiving each network packet that contains a chunk of the portion (615) of the data (601). The target DMA engine (800) may reduce the value of the receive counter (806) by the size of the chunk of the portion (615) contained in each network packet.

The method of FIG. 8 also includes receiving (808), by the target DMA engine (800), the remaining portion (617) of the data (601) transferred from the origin DMA engine using the direct put operation. The target DMA engine (800) may receive (808) the remaining portion (617) of the data (601) according to the method of FIG. 8 by receiving network packets from the origin DMA engine that contain chunks of the remaining portion (617) of the data (601) transferred using a direct put transfer, extracting the chunks of the remaining portion (617) from the network packets, and storing the chunks of the remaining portion (617) in a storage location specified in the network packets from which the chunks were extracted.

The method of FIG. 8 includes decrementing (810), by the target DMA engine (800), the same receive counter (806) in response to receiving the data (601) from the origin DMA engine using the direct put operation. The target DMA engine (800) may decrement (810) the same receive counter (806) according to the method of FIG. 8 by reducing the value of the receive counter (806) after receiving each network packet that contains a chunk of the remaining portion (617) of the data (601). The target DMA engine (800) may reduce the value of the receive counter (806) by the size of the chunk of the remaining portion (617) contained in each network packet.

The method of FIG. 8 includes determining (812), by the target DMA engine (800), whether the receive counter (806) is decremented to zero. The target DMA engine (800) may determine (812) whether the receive counter (806) is decremented to zero according to the method of FIG. 8 by identifying the value of the receive counter (806) each time the receive counter (806) is decremented. If the value of the receive counter (806) is zero, then the receive counter (806) is decremented to zero. If the value of the receive counter (806) is not zero, then the receive counter (806) is not decremented to zero.

The method of FIG. 8 includes continuing (816) to receive the data (601) if the receive counter (806) is not decremented to zero. The target DMA engine (800) may continue (816) to receive the data (601) according to the method of FIG. 8 by continuing to receive the portion (615) of the data (601) transferred from the origin DMA engine using the memory FIFO operation and continuing to receive the remaining portion (617) of the data (601) transferred from the origin DMA engine using the direct put operation as described above.

The method of FIG. 8 also includes notifying (814), by the target DMA engine (800), a target processing core on the target compute node (604) that the data transfer is complete if the receive counter (806) is decremented to zero. The target DMA engine (800) may notify (814) a target processing core on the target compute node (604) that the data transfer is complete according to the method of FIG. 8 by triggering an interrupt. Triggering an interrupt serves to notify a processing core on the target compute node (604) that the transfer of the data (601) is complete. The target DMA engine (800) may also notify (814) a target processing core on the target compute node (604) that the data transfer is complete according to the method of FIG. 8 by setting the status bit corresponding to the receive counter (806) in a DMA counter status register. Setting the status bit corresponding to the receive counter (806) in a DMA counter status register serves to notify the processing core on the target compute node (604) that the transfer of the data (601) is complete because the processing core may periodically poll the DMA counter status register.

Figure 9:
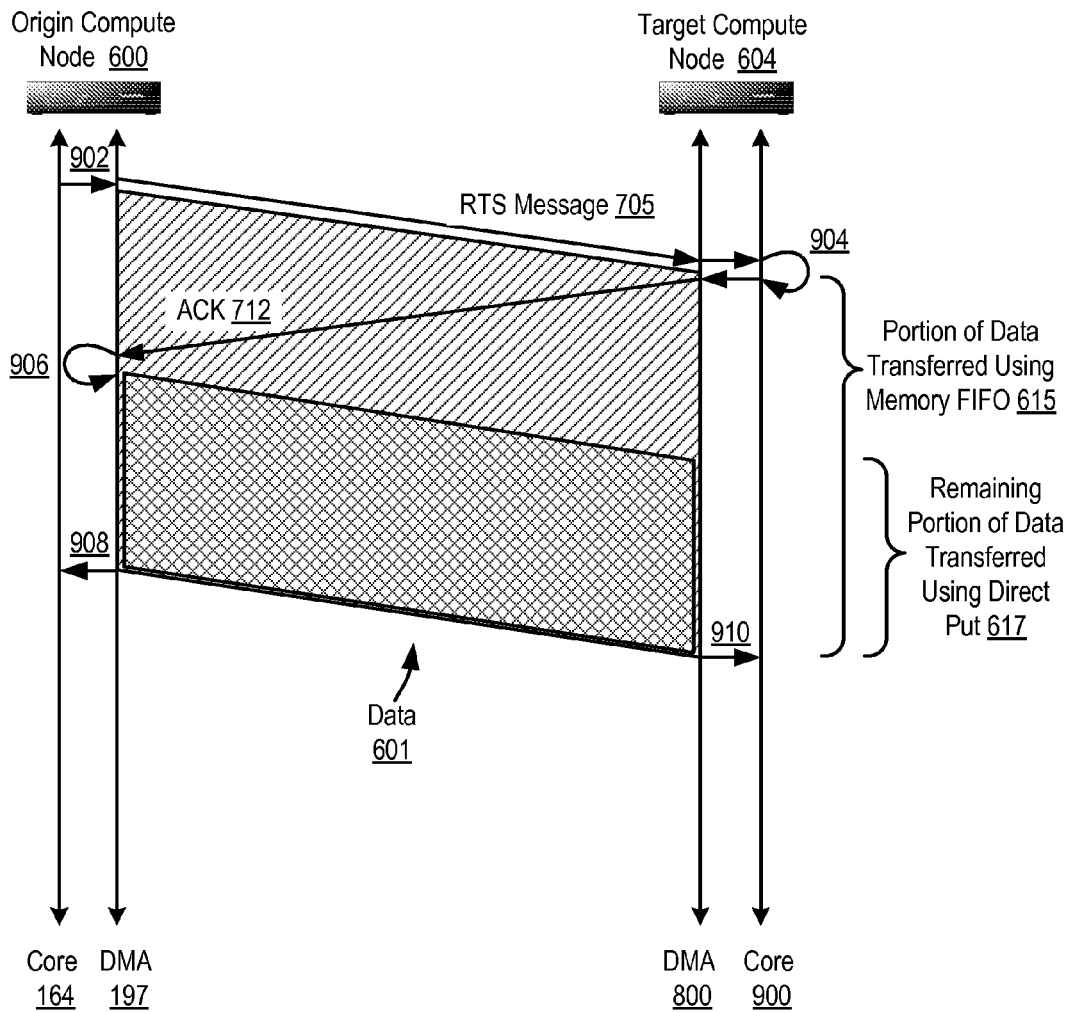
FIG. 9 sets forth a call sequence diagram illustrating an exemplary call sequence for low latency, high bandwidth data transfers between compute nodes in a parallel computer according to the present invention.

For further explanation, FIG. 9 sets forth a call sequence diagram illustrating an exemplary call sequence for low latency, high bandwidth data transfers between compute nodes in a parallel computer according to the present invention. The exemplary call sequence diagram of FIG. 9 includes two compute nodes (600, 604), an origin compute node (600) and a target compute node (604). The origin compute node (600) includes a processing core (164) and an origin DMA engine (197). The target compute node (604) includes a processing core (900) and a target DMA engine (800).

In the exemplary call sequence diagram of FIG. 9, the origin DMA engine (197) processes (902) a request from the origin node's processing core to transfer data (601) from the origin compute node (600) to the target compute node (604). The origin DMA engine (197) processes (902) the data transfer request in FIG. 9 by receiving a buffer identifier for a buffer containing data (601) for transfer to a target compute node, sending a request to send ('RTS') message (705) to the target DMA engine (800), and transferring a portion (615) of the data (601) to the target compute node (604) using a memory FIFO operation. The origin DMA engine (197) may transfer a portion (615) of the data (601) to the target compute node (604) using a memory FIFO operation in the example of FIG. 9 by processing a memory FIFO data descriptor specifying a memory FIFO operation and specifying one end of the buffer from which to begin transferring the portion (615) of the data (601) using the memory FIFO operation.

In the exemplary call sequence diagram of FIG. 9, the origin DMA engine (197) sends the RTS message (705) to the target compute node (604) to retrieve the required data from the target compute node (604) for the origin DMA engine (197) to transfer any remaining portion (617) of the data (601) using a direct put operation. The RTS message (705) of FIG. 9 includes a direct put data descriptor used by the target compute node (604) to perform a remote get operation that transfers the remaining portion (617) of the data (601) using a direct put operation.

When the target compute node (604) receives the RTS message (705) in the example of FIG. 9, the target node's processing core (900) inscribes (904) a location for storing the data (601) on the target compute node (604) into the direct put data descriptor. The target node's processing core (900) then instructs (904) the target DMA engine (800) to issue an acknowledgement (712) to the RTS message (705). In the example of FIG. 9, the acknowledgement (712) is implemented as a remote get packet that includes the direct put data descriptor, which now contains the storage location information for the data on the target compute node (604).

In the exemplary call sequence diagram of FIG. 9, the origin DMA engine (197) processes (906) the acknowledgement (712) of the RTS message (705) from the target compute node (604). The origin DMA engine (197) processes (906) the acknowledgement (712) by receiving the acknowledgement (712) of the RTS message (705) from the target compute node (604) and transferring, in response to receiving the acknowledgement (712) of the RTS message (705), any remaining portion (617) of the data (601) to the target compute node (604) using a direct put operation, including initiating the direct put operation without invoking an origin processing core (164) on the origin compute node (600).

In the example of FIG. 9, readers will note that while the origin DMA engine (197) transfers the portion (615) of the data (601) using a memory FIFO operation, the origin DMA engine (197) concurrently transfers the remaining portion (617) of the data (601) using a direct put operation. That is, in the exemplary call sequence diagram of FIG. 9, two different portions (615, 617) of the data (601) are being transferred concurrently using two different DMA transfer operations—a memory FIFO operation and a direct put operation.

As the origin DMA engine (197) transfers the data (601) to the target compute node (604), regardless of whether data is transferred using a memory FIFO transfer or a direct put transfer, the origin DMA engine (197) decrements a send counter and determines whether the send counter is decremented to zero. As mentioned above, the send counter is DMA counter used to track when the transfer of the data (601) is complete. When the send counter is decremented to zero, the origin DMA engine (197) notifies (908) the origin processing core (164) on the origin compute node (600) that the data transfer is complete.

Similarly, as the target DMA engine (800) receives the data (601) from the origin compute node (600), regardless of whether data is received as part of a memory FIFO transfer or a direct put transfer, the target DMA engine (800) decrements a receive counter and determines whether the receive counter is decremented to zero. When the receive counter is decremented to zero, the target DMA engine (800) notifies (910) the target processing core (900) on the target compute node (604) that the data transfer is complete.

Exemplary embodiments of the present invention are described largely in the context of a fully functional computer system for low latency, high bandwidth data transfers between compute nodes in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for low latency, high bandwidth data transfers between compute nodes in a parallel computer, the system comprising an origin compute node and a target compute node, each compute node comprising one or more computer processors, a DMA controller, a DMA engine installed upon the DMA controller, and computer memory operatively coupled to the computer processors, the DMA controller, and the DMA engine, the computer memory for the origin compute node having disposed within it computer program instructions that when executed by one of the computer processors cause the system to carry out the steps of:

transferring, by the origin DMA engine, a portion of the data to the target compute node using a memory FIFO operation, the memory FIFO operation specifying one end of the buffer from which to begin transferring the portion of the data;

receiving, by an origin direct memory access ('DMA') engine, an acknowledgement of an request to send ('RTS') message from a target compute node; and transferring, concurrently with the transfer of the portion of the data to the target compute node using the memory FIFO operation, by the origin DMA engine in response to receiving the acknowledgement of the RTS message, any remaining portion of data in a buffer for transfer to the target compute node, to the target compute node using a direct put operation, including initiating the direct put operation without invoking an origin processing core on the origin compute node, the direct put operation specifying the other end of the buffer from which to begin transferring the remaining portion of the data.

2. The system of claim 1 wherein initiating the direct put operation without invoking a processing core further comprises:

receiving a direct put data descriptor for a remote get operation from the target compute node; and injecting the direct put data descriptor for the remote get operation into a high priority injection FIFO buffer for the origin DMA engine.

3. The system of claim 1 wherein the computer memory for the target compute node has disposed within it computer program instructions that when executed by one of the computer processors cause the system to carry out the steps of:

receiving, by the target DMA engine, the remaining portion of the data transferred from the origin DMA engine using the direct put operation;

decrementing, by the target DMA engine, a same receive counter in response to receiving the data from the origin DMA engine using the direct put operation;

determining, by the target DMA engine, whether the receive counter is decremented to zero; and notifying, by the target DMA engine, a target processing core on the target compute node that the data transfer is complete if the receive counter is decremented to zero.

4. The system of claim 1 wherein the origin compute node and the target compute node are comprised in a parallel computer, the parallel computer comprising a plurality of compute nodes connected for data communications through the data communications network, the data communications network optimized for point to point data communications.

5. A computer program product for low latency, high bandwidth data transfers between compute nodes in a parallel computer, the computer program product disposed upon a computer readable medium, wherein the computer readable medium is not a signal, the computer program product comprising computer program instructions that when executed by a computer cause the computer to carry out the steps of:

transferring, by the origin DMA engine, a portion of the data to the target compute node using a memory FIFO operation, the memory FIFO operation specifying one end of the buffer from which to begin transferring the portion of the data;

receiving, by an origin direct memory access ('DMA') engine, an acknowledgement of an request to send ('RTS') message from a target compute node; and transferring, concurrently with the transfer of the portion of the data to the target compute node using the memory FIFO operation, by the origin DMA engine in response to receiving the acknowledgement of the RTS message, any remaining portion of data in a buffer for transfer to the target compute node, to the target compute node using a direct put operation, including initiating the direct put operation without invoking an origin processing core on the origin compute node, the direct put operation specifying the other end of the buffer from which to begin transferring the remaining portion of the data.

6. The computer program product of claim 5 wherein initiating the direct put operation without invoking a processing core further comprises:

receiving a direct put data descriptor for a remote get operation from the target compute node; and injecting the direct put data descriptor for the remote get operation into a high priority injection FIFO buffer for the origin DMA engine.

7. The computer program product of claim 5 further comprising computer program instructions that when executed by the computer cause the computer to carry out the steps of:

receiving, by the target DMA engine, the remaining portion of the data transferred from the origin DMA engine using the direct put operation;

decrementing, by the target DMA engine, a same receive counter in response to receiving the data from the origin DMA engine using the direct put operation;

determining, by the target DMA engine, whether the receive counter is decremented to zero; and notifying, by the target DMA engine, a target processing core on the target compute node that the data transfer is complete if the receive counter is decremented to zero.

8. The computer program product of claim 5 wherein the origin compute node and the target compute node are comprised in a parallel computer, the parallel computer comprising a plurality of compute nodes connected for data communications through the data communications network, the data communications network optimized for point to point data communications.

* * * * *